April 12, 1949.   P. C. GARDINER   2,467,202
PULSE-ECHO SYSTEM
Filed Feb. 27, 1946

Inventor:
Paul C. Gardiner,
by Merton O. Moore
His Attorney.

Patented Apr. 12, 1949

2,467,202

UNITED STATES PATENT OFFICE 2,467,202

PULSE-ECHO SYSTEM

Paul C. Gardiner, Scotia, N. Y., assignor to General Electric Company, a corporation of New York Application February 27, 1946, Serial No. 650,697

5 Claims. (Cl. 343—11)

1

My invention relates to pulse echo systems and more particularly to such systems wherein a record is made of the location of remote objects and which may be operated without the knowledge of observers on these objects.

In one type of pulse-echo system, recurrent directional energy pulses are transmitted and the corresponding return pulses detected by suitable receiving means, the return pulses being due to reflection of the transmitted pulses by remote objects or to the operation of reply apparatus situated on remote objects. The time interval between each transmitted pulse and the corresponding return pulse is accurately measured to determine the distance of the remote object and the direction of the energy pulse used to determine the direction of the remote object.

It is an object of my invention to provide an improved pulse-echo system.

It is a further object of my invention to provide a pulse-echo system wherein a permanent record is obtained of the location of remote objects surrounding the equipment.

Figure 2:
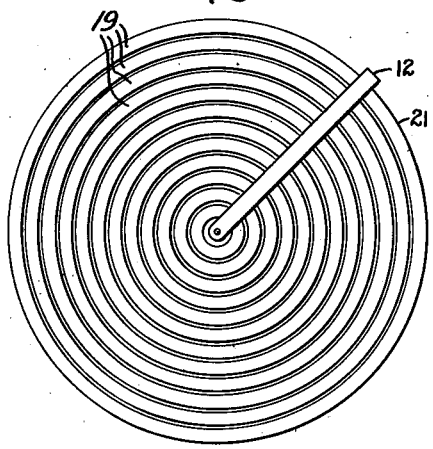
Figure 3:
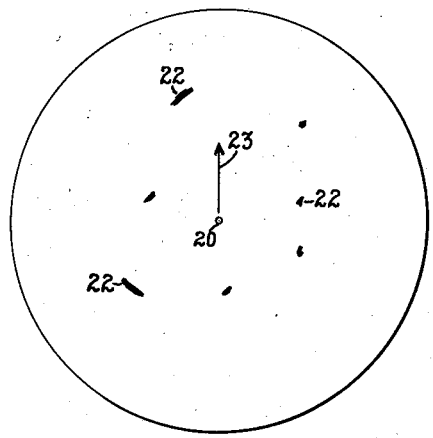

The novel features which I believe characteristic of my invention are set forth with particularity in the appended claims. My invention itself, however, both as to its organization and method of operation together with further objects and advantages thereof may best be understood by reference to the following description taken in connection with the accompanying drawings in which Fig. 1 shows a general plan view and partial schematic diagram of a radio type pulse-echo equipment incorporating my invention, Fig. 2 is a view showing the relative disposition of the commutator and bar members of my invention, and Fig. 3 shows the appearance of the record obtained with my invention.

Figure 1:
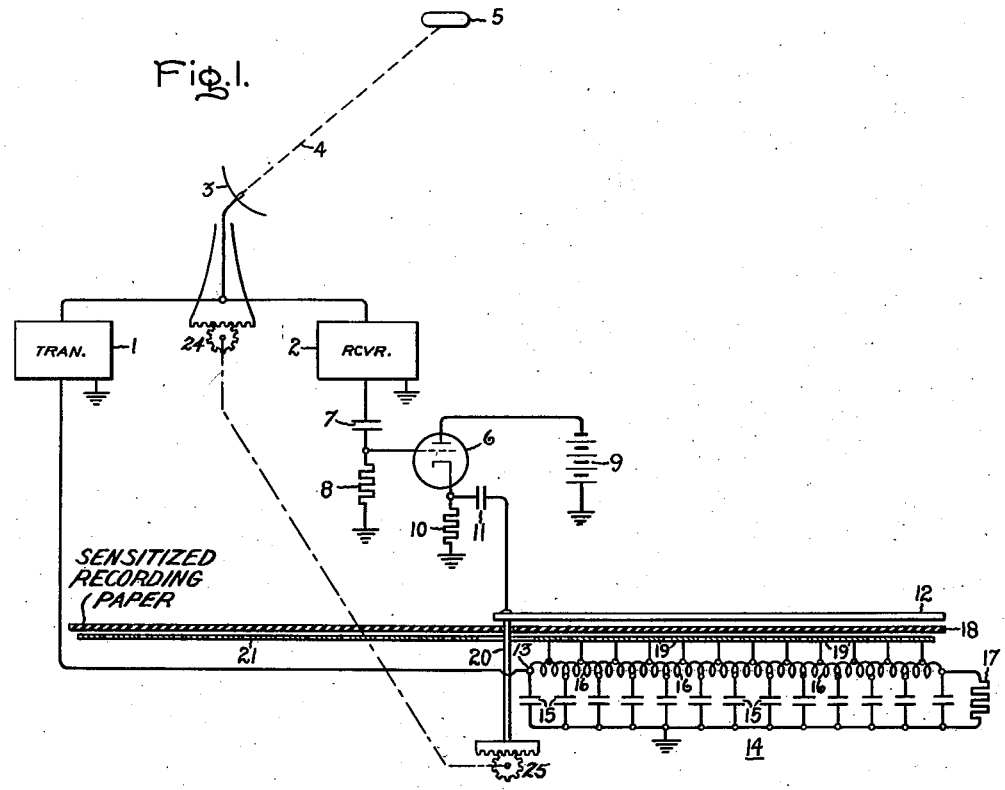

In Fig. 1 a radio type pulse-echo system having transmitter 1 and receiver 2 is shown. Recurrent radio frequency energy pulses are applied from transmitter 1 to antenna 3, the latter being highly directive and emitting maximum energy in the particular direction indicated by beam 4. Return energy from remote object 5 appears at antenna 3 from which it is applied to receiver 2 to produce a voltage pulse delayed from the transmitted pulse by a time corresponding to the time required for the wave to pass from antenna 3 to object 5 and back to antenna 3. This received voltage wave appears at the output of receiver 2 as a sudden pulse of voltage which is applied to the control electrode of electron discharge device 6 through coupling capacitor 7 and resistance 8. This voltage at the grid of device

2

6 causes a change in current flow through battery 9 and cathode resistance 10, the current flow increasing as the control electrode of device 6 swings positive. This produces a positive voltage across resistance 10 which is applied through coupling capacitor 11 to conducting bar 12.

A voltage pulse is developed in transmitter 1 each time that unit produces an energy pulse. This voltage is applied to terminal 13 of artificial transmission line 14 and travels along this transmission line at a nearly uniform velocity. Artificial transmission line 14 is made up of a plurality of parallel connected capacitors 15 and series connected inductances 16. Resistance 17 is of value equal to the characteristic impedance of line 14 and prevents reflection of voltage pulses reaching the end of that line.

Sensitized recording paper 18, shown in cross-section in Fig. 1, is located underneath bar 12. This paper may be of electrolytic or other type producing a visible mark when subjected to voltage in excess of a predetermined value. Underneath paper 18 is located a commutator 21, shown in cross-section in Fig. 1. As is better shown in Fig. 2, commutator 21 comprises a series of annular members 19. Each member 19 consists of a conducting ring concentric with the center shaft 20 and connected to a point on artificial transmission line 14 having voltage of time delay corresponding to the radius of that member. Hence, the voltage pulses at point 13 corresponding to a transmitted energy pulse first appears at the inner members 19 and then progressively passes from one member to the other in accordance with the passage of time.

If a received signal appears at antenna 3 after a transmitted pulse, a voltage pulse is produced by receiver 2 which passes through amplifier 6 and is applied to bar 12. Receiver 2 is designed to produce a positive voltage pulse at the control electrode of device 6 when a return pulse is received, thereby producing a positive voltage pulse at bar 12. This pulse, however, is not of sufficient magnitude with respect to the ground potential normally existing at members 19 to cause an indication on sensitized paper 18. Hence this voltage pulse itself produces no mark.

The transmitted pulse which gives rise to each received pulse is applied to terminal 13 of artificial transmission line 14 so that members 19 have voltage successively applied to them as this pulse progresses down the line in accordance with the time interval after the transmited pulse. This voltage is made negative with respect to ground potential but is also of insufficient magnitude to mark sensitized paper 18 when bar 12 is at ground potential.

The voltages applied to bar 12 from receiver 2 and from transmitter 1 to terminal 13 of artificial transmission line 14 are chosen to be of values such that paper 18 is marked when these voltages are applied simultaneously to these two members. Hence, when the received pulse causes a voltage on bar 12, paper 18 will be marked at a point corresponding to the particular member 19 which has a negative voltage pulse at that time. This produces a mark on paper 18 which is displaced from shaft 20 by a distance determined by the time delay between the pulses and hence the distance between antenna 3 and remote object 5.

In order to produce a map-like record of the location of all remote objects about antenna 3, the line along which material 18 is marked by bar 12 and commutator 19 is rotated in accordance with rotation of antenna 3. In the embodiment of this invention shown in Fig. 1 this is accomplished by gears 24 and 25 which are connected to antenna 3 and bar 12 respectively. Inasmuch as these gears are mechanically interconnected, rotation of antenna 3 causes a corresponding rotation of bar 12. The resulting effects on the recording material may be understood most clearly by reference to Fig. 2 which shows a plan view of commutator 21 and bar 12 without the presence of recording material 18. As is evident from Fig. 2, bar 12 may be rotated in accordance with the position of antenna 3, thereby causing the paper to be marked in accordance with the distance and direction of each remote object.

Fig. 3 shows the recording material as marked by the above-described equipment. As shown in the figure, a plurality of marks 22 are produced, each representing a remote object. A glance at this chart immediately provides the operator with an indication of all objects surrounding him for the center of the paper represents his position, and a known axis such as 23 represents a predetermined base line such as the north direction.

It will be evident that this system has many advantages not possessed by the prior art pulse-echo equipments. The time interval between successive operations of the equipment is not significant as the marking on the recording material is not changed over a reasonable period of time. The cumulative effects of a number of transmitted and received pulses extended over a long period of time will produce a usable record with this equipment even though no single pulse provides such information.

A further advantage of my system is that a permanent record is made available of the location of all objects surrounding the pulse-echo equipment. Thus, the system may be arranged to operate for a period of time and then the chart removed for detailed study. If, for instance, the pulse-echo system is located on a commercial ship it will merely be necessary to make one chart every half hour or longer period of time so long as the distance of remote objects shown on the chart is always greater in range than the possible travel of the ship during that time. This not only frees the operator who would otherwise be required to constantly observe and operate the equipment, but also provides a convenient means for presenting this information to navigators and other personnel not capable of operating the equipment or normally located in its vicinity. In case of collision, these records would have special value to investigators attempting to determine the cause of the accident.

While I have shown and described my invention as applied to a particular system of connections as embodying various devices diagrammatically shown, it will be apparent to those skilled in the art that changes and modifications may be made without departing therefrom and I, therefore, aim in the appended claims to cover all such changes and modifications as fall within the true spirit and scope of my invention.

What I claim as new and desire to secure by Letters Patent of the United States is:

1. In a pulse-echo system of the type wherein energy pulses are transmitted and received, an artificial transmission line, means to apply a voltage pulse to one end of said line each time a pulse is transmitted, a sheet of electro-sensitive material, means to apply a predetermined voltage stress to said material along a predetermined axis each time an energy pulse is received, means comprising said line to apply a second voltage stress to said material, said second stress being applied to one point in said material on said axis when a pulse is transmitted and progressively applied from said line to points spaced away from said first point along said axis as said voltage pulse travels along said line, said predetermined voltage stresses being insufficient in themselves to mark said material but sufficient together to produce a visible indication at a point on said axis where said stresses coincide in time, thereby to indicate on said material the distance of a remote object.

2. In a pulse-echo system of the type wherein energy pulses are directively transmitted or received, an artificial transmission line, means to apply a voltage pulse to one end of said line each time a pulse is transmitted, a sheet of electro-sensitive material, means to apply a predetermined voltage stress to said material each time an energy pulse is received, said stress being applied along an axis on said material corresponding to the direction of said energy pulses, means comprising said line to apply a second voltage stress to said material, said second stress being applied to one end of said axis on said material when a pulse is transmitted and progressively applied from said line to points spaced away from said end as said voltage pulse travels along said line, said predetermined voltage stresses being insufficient in themselves to mark said material but sufficient together to produce a visible indication at a point on said axis where said stresses coincide in time, thereby to indicate on said material the location of said remote objects.

3. In a pulse-echo system of the type wherein the distance of a remote object is determined by the time interval between pulses transmitted toward said object from a rotatable antenna system and return energy pulses, a recording medium having a flat surface, a bar member, means to rotate said bar member about one end in a plane parallel to the surface of said medium, means to cause the position of said bar to correspond continuously with the orientation of said antenna system, and means responsive to said pulses to mark said medium at a point corresponding to the position of said bar and having distance from said end thereof determined by the distance of said remote object.

4. In a pulse-echo system, means for transmitting pulses of high frequency energy in a given space direction and for receiving echoes from remote reflecting objects, a planar sheet of recording material, a linear metal bar positioned in a parallel plane close to one face of said sheet, a transmission line, means for impressing said transmitted pulses on one end of said line, thereby to cause a voltage wave to travel along said line, means comprising said line for impressing said voltage wave between said bar and a plurality of points lying on an axis parallel to said bar and close to the opposite face of said sheet, said points being energized progressively in one direction along said axis in accordance with the travel of said wave along said line, and means for impressing said received echoes between said points and said bar, said material being adapted to have a distinctive mark produced thereon in response to coincidence of said voltage wave and said echoes.

5. In a pulse-echo system, means comprising a rotatable directive antenna system for transmitting pulses of high frequency energy and for receiving echoes from remote objects toward which said antenna system is oriented, a planar sheet of recording material, a linear metal bar pivoted near one end for rotation in a parallel plane close to one face of said sheet, means for maintaining said bar oriented with said antenna system, a transmission line, means for impressing said transmitted pulses on one end of said line, thereby to cause a voltage wave to travel along said line, means comprising said line for impressing said voltage wave between said bar and a plurality of points lying on an axis parallel to said bar and close to the opposite face of said sheet, said points being energized progressively in accordance with the travel of said wave along said line, beginning with a point near said pivot and progressing in an outward radial direction, and means for impressing said received echoes between said points and said bar, said material being adapted to have a distinctive mark produced thereon in response to coincidence of said voltage wave and said echoes.

PAUL C. GARDINER.

REFERENCES CITED

The following references are of record in the file of this patent:

UNITED STATES PATENTS

| Number | Name | Date |
|---|---|---|
| 1,954,955 | Siebers | Apr. 17, 1934 |
| 2,403,562 | Smith | July 9, 1946 |
| 2,415,981 | Wolff | Feb. 18, 1947 |
| 2,422,295 | Eaton | June 17, 1947 |

Disclaimer 2,467,202.—*Paul C. Gardiner*, Scotia, N. Y. PULSE-ECHO SYSTEM. Patent dated Apr. 12, 1949. Disclaimer filed Mar. 25, 1950, by the assignee, *General Electric Company*.

Hereby enters this disclaimer to claims 1, 2, and 3 of said patent.

[*Official Gazette May 2, 1950*.]